US007519901B2

(12) United States Patent
Price et al.

(10) Patent No.: US 7,519,901 B2
(45) Date of Patent: Apr. 14, 2009

(54) METHODS AND SYSTEMS FOR SELECTING OBJECTS BY GROUPING ANNOTATIONS ON THE OBJECTS

(75) Inventors: Morgan N. Price, Lafayette, CA (US); Gene Golovchinsky, Palo Alto, CA (US); Catherine C. Marshall, San Francisco, CA (US); William N. Schilit, Menlo Park, CA (US); Patrick Chiu, Menlo Park, CA (US); Kei Tanaka, Hiratsuka (JP)

(73) Assignee: Fuji Xerox Co., Ltd., Tokyo (JP)

( * ) Notice: Subject to any disclaimer, the term of this patent is extended or adjusted under 35 U.S.C. 154(b) by 393 days.

(21) Appl. No.: 10/461,498

(22) Filed: Jun. 16, 2003

(65) Prior Publication Data
US 2004/0255242 A1    Dec. 16, 2004

(51) Int. Cl.
*G06F 17/00* (2006.01)
(52) U.S. Cl. ...................... 715/233; 715/231
(58) Field of Classification Search .............. 715/770, 715/512, 230, 231, 232, 233, 255
See application file for complete search history.

(56) References Cited

U.S. PATENT DOCUMENTS

| 5,471,578 | A |   | 11/1995 | Moran et al. |         |
|-----------|---|---|---------|--------------|---------|
| 5,680,636 | A | * | 10/1997 | Levine et al.| 715/512 |
| 5,740,341 | A | * | 4/1998  | Oota et al.  | 345/420 |
| 5,812,137 | A | * | 9/1998  | Kerker et al.| 345/420 |
| 5,826,025 | A | * | 10/1998 | Gramlich     | 709/217 |
| 5,832,474 | A | * | 11/1998 | Lopresti et al.| 707/2 |
| 5,861,886 | A | * | 1/1999  | Moran et al. | 715/863 |
| 5,889,523 | A |   | 3/1999  | Wilcox et al.|         |
| 6,041,335 | A | * | 3/2000  | Merritt et al.| 715/512 |
| 6,320,601 | B1 | * | 11/2001 | Takasu et al.| 715/764 |
| 6,340,967 | B1 | * | 1/2002  | Maxted       | 345/179 |
| 7,225,397 | B2 | * | 5/2007  | Fukuda et al.| 715/230 |
| 2002/0116420 | A1 | * | 8/2002 | Allam et al. | 707/526 |

FOREIGN PATENT DOCUMENTS

EP      1 016 983 A2  *  7/2000

OTHER PUBLICATIONS

Patrick Chiu et al.; "A Dynamic Grouping Technique for Ink and Audio Notes" UIST; 1998 pp. 195-202.
Thomas P. Moran et al.; "Implicit Structures for Pen-Based Systems Within a Freeform Interaction Paradigm" In proceedings of CHI'95; pp. 1-8.

(Continued)

*Primary Examiner*—Laurie Ries
(74) *Attorney, Agent, or Firm*—Sughrue Mion, PLLC

(57) ABSTRACT

The technique for selecting at least a part of object on an electronic media includes, providing annotations on the object, grouping the annotation on the object, and selecting one or both of the object and the annotations based on the grouping of the annotations on the object. The techniques also provide the system that selects a part of object on a media, that includes an annotation grouping circuit that provides annotations on the object and groups the annotations on the object, and an object selection circuit that selects at least one of the object and the annotations based on the grouping of the annotation on the object.

20 Claims, 9 Drawing Sheets

OTHER PUBLICATIONS

Thomas P. Moran et al.; "Pen Based Interaction Techniques for Organizing Material on an Electronic Whiteboard" In proceedings of UIST '97; pp. 1-10.

Alex D. Poon et al. "The PEN-Ivory Project: Exploring User-interface Design for the Selection of Items from Large Controlled Vocabularies of Medicine" JAMIA; 1996 pp. 168-183.

Bill N. Schilit et al.; "Digital Library Information Appliances" In proceedings of Digital Libraries 1998.

Lynn D. Wilcox; "Dynomite: A Dynamically Organized Ink and Audio Notebook".

Dorin Comaniciu; "Mean Shift: A Robust Approach Toward Feature Space Analysis" IEEE; vol. 24, No. 5; May 2002 pp. 1-18.

* cited by examiner

300

310

Metuo foras at praesent virtus cui macto, conventio, tation vereor consequat multo. Eu exerci ideo eu in letatio fere melior dolor commodo letalis utinam dolore. Imputo delenit augue iusto esse consequat facilisi obruo. Camur vero eligo ut adsum pneum lucidus saepius tation saepius, ibidem aptent si tincidunt damnum. Populus sed feugait accumsan dolus, erat tation pagus modo sino, decet proprius abigo. In incassum ut ut eum conventio esse epulae consequat comis, at erat. Quis, letatio, exerci at iriure nostrud ad paulatim nunc obruo. Antehabeo wisi, eligo sed, torqueo et secundum.

— 320

— 330

Tristique, dolore vulputate abigo capio pagus conventio vulputate at feugiat tamen commodo metuo. Capto hendrerit, iustum validus ulciscor cui. Nostrud secundum feugiat ut, vel hendrerit. Metuo qui bis lobortis wisi uxor tation. Huic scisco velit premo causa sudo ullamcorper indoles, hendrerit ideo acsi autem. Commodo jus, sagaciter pala, iriure eu in. Verto wisi bene tincidunt nibh gilvus enim blandit, tamen. Verto camur distineo erat, mauris esca quis epulae nulla, ex nostrud.

— 340

Turpis pagus opes uxor enim lobortis. Suscipere ut eu blandit illum inhibeo similis quidem volutpat secundum volutpat. Gravis praesent importunus ut facilisi wisi. Huic torqueo tego lenis in, hendrerit damnum nobis sino.

In cogo feugiat occuro quis eum, vulpes sagaciter praesent feugait quidem iustum, ut saluto.

350

Populus vero nonummy ut importunus vulpes abdo. Accumsan eligo gemino aliquip dolore nonummy.

On certiorari, the United States Supreme Court affirmed. In an opinion by Kennedy, J. joined by Blackburn, Stevens, O'Connor, and Souter, JJ., it was held that (1) the inclusion of an invocation and benediction by a member of the clergy at a public secondary school graduation is forbidden by the establishment of religion clause where (a) state officials direct the performance of such a formal religious exercise, and (b) the state, in every practical sense, compels attendance and participation in the exercise; (2) a state may not, consistent with the establishment of religious clause, place-students who object to such an exercise in the dilemma of participating in the exercise or protesting against it; and (3) the invocation and benediction in question were

500 affirmed...Kennedy, J...Blackburn, Stevens, O'Connor, and Souter,...where...officials direct the performance of such a formal religious exercise...state...compels attendance...students who object to such an exercise in the dilemma of participating in the exercise or protesting against it

FIG. 3

METHODS AND SYSTEMS FOR SELECTING OBJECTS BY GROUPING ANNOTATIONS ON THE OBJECTS

BACKGROUND OF THE INVENTION

1. Field of Invention

This invention relates to selecting objects on an electronic media.

2. Description of Related Art

One of the major potential benefits of reading electronic media, such as an electronic document, is that readers can select and copy material automatically, without needing to retype it. The readers copy text, graphics and the like for various reasons, including adding quotations to documents that they are writing, or reducing their reading into snippets that they can organize and analyze.

When establishing the authority of a statement, such as in legal writing, quoting is particularly important. That is, legal arguments generally rest on points of law taken from previous cases. Furthermore, quotes are often discontiguous. For readability, legal writers often shorten quotes by using ellipsis. Legal writers also often stitch together sections of separate quotes with clauses of their own.

In addition, digital ink has become available to make annotations on electronic media. For example, the user may electronically underline and/or highlight text and/or add notes in margin regions of electronic documents. However, when the user uses digital ink, such as freeform digital ink, to make notes, the notes often must be retyped or individually copied to another medium if the annotated media needs to be copied to another form of media. This can be extremely time consuming and not accurate.

Discontiguous selection is a common feature of graphical user interface (GUI) systems. For example, in a graphical computer operating system, such as Microsoft Windows®, typically the user needs to use a modifier, such as depressing the control key, in addition to using a mouse button, to add to an existing selection, rather than starting a new selection.

A freeform digital ink whiteboard, known as Tivoli and disclosed in U.S. Pat. No. 5,471,578 to Moran et al., supports freeform ink note taking and annotating as well as selection. In this system, when the user circles an object, the system interprets the circle as a selection gesture rather than an annotation. In this system, explicit interaction of the marks with respect to the underlying object begins when the user completes the circle gesture.

In "Implicit Structures for Pen-Based Systems Within a Freeform Interaction Paradigm", Proceedings of CHI '95, AMC Press, pp. 487-494, Moran et al. disclose this system and teach selection gestures using vertical or horizontal brackets or pairs of brackets. Using this system, the user can draw a vertical or horizontal bracket or a pair of the brackets to select an underlying object. Similarly, U.S. Pat. No. 5,889,523 to Wilcox et al. discloses a system that selects gestures by underlines.

In these references, the shift from annotation to explicit interaction takes place when the user double taps on a stroke. The system then recognizes the double tap as a gesture. However, these systems are not capable of interpreting more than one annotation as a selection. Although Moran's system does allow users to modify selection gestures with further gestures, these further gestures are explicit modifiers to the selection rather than annotations.

Moran's system and U.S. Pat. No. 5,861,886 to Kurtenbach et al. disclose another relevant selection technique called "freeform enclosure." In this technique, the system interprets strokes with the endpoints near each other as persistent groupings. The user can tap on the enclosure stroke to select the enclosure and the contained objects. However, in this technique, annotations are not grouped to select underlying objects. Although Moran's system can detect the overlap of two enclosures, and certain gestures within the overlap act on all objects present in the two overlapping enclosures, there is no way for users to select the objects within the intersection of two regions. Furthermore, overlapping is a very limited form of grouping. That is, grouping by overlapping does not allow disparate selections. Moreover, overlapping is not an appropriate way to group freeform underlines, freeform highlights, or text range annotations. Finally, Moran's system acts on the objects that are contained by both enclosures.

Chiu and Wilcox describe, in "A Dynamic Grouping Technique for Ink and Audio Notes", Proceeding of UIST '98 (Nov. 1-4, 1998), ACM Press, pp. 195-202, a system for freeform ink and audio note taking that determines groups of ink strokes and that allows the user to select a group of strokes and play the associated audio.

U.S. Pat. No. 6,687,876, incorporated herein by reference in its entirety, suggests several types of automatic actions that can take place on annotated text. For example, the system automatically resolve and fetch secondary references when the user annotates a reference. In one mode, the system takes action automatically, as with resolving and fetching references. In another mode, the user invokes the action on one or more documents. In response, the system acts on all of the annotations in those documents. Therefore, the system disclosed in the incorporated 962 application has no concept of selection on text. The incorporated 962 application does not suggest allowing the user to take action on any specific annotated passage.

The interface disclosed in "The Pen-Ivory Project: Exploring User-Interface Design for the Selection of Items from Large Controlled Vocabularies of Medicine", JAMIA 1996; 3:168-183, allows users to identify a medical condition as "present" or "not present" by circling the medical condition or by crossing out the medical condition, respectively. In the Pen-Ivory system, the stroke is treated as both the selection and the command, rather than treating the selection and command as individual actions.

SUMMARY OF THE INVENTION

This invention provides methods and systems for selecting an object on a media by grouping annotations on the object.

This invention also provides a system for selecting at least a part of at least one object on an electronic media.

In various exemplary embodiments of the systems and methods according to this invention, annotations made by the user are first grouped on underlying objects. A plurality of annotations can be grouped on each of one or more underlying objects. Then, when the user invokes a command on one of the annotations and the underlying objects by, for example, clicking on the annotations or the underlying objects, one or both of the annotations and the underlying objects are selected.

The selected annotations and/or the underlying object can be modified. For example, the selected annotations and/or the underlying object may be modified such that non-annotated sections in the selected object may be replaced with ellipsis. The selected annotations and/or the underlying object may directly copy to another media, or may be indirectly copied by, for example, copying the selected annotations and/or the underlying object in a temporary storage location, such as a clip board.

Various exemplary embodiments of the systems according to this invention include an annotation grouping circuit or routine that provides at least one annotation on the a part of the object and groups the annotation on the object and an object selection circuit that selects at least one of a part of the object and the annotation based on the grouping of the annotation on the object.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of the systems and methods of this invention will be described in detail, with reference to the following figures, wherein:

FIG. 1 is a first example of a document with annotations;

FIG. 2 is a second example of a document with annotations;

FIG. 3 is an example of a selection of the annotated section of an object of the second exemplary document shown in FIG. 2 according to this invention;

DETAILED DESCRIPTION OF EXEMPLARY EMBODIMENTS

Figure 4:
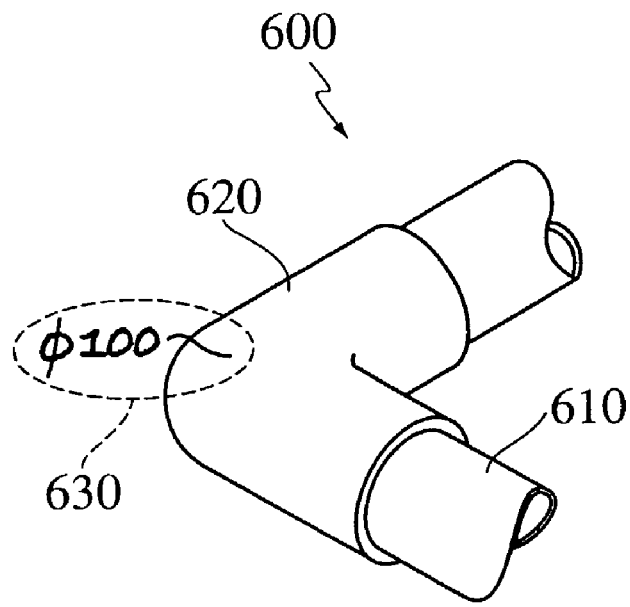
FIGS. 4 and 5 illustrate a second exemplary embodiment of selecting an object according to this invention.

FIG. 1 shows a first exemplary embodiment of an object, such as a portion of an electronic document, and annotations marked on the object usable with the systems and methods of this invention. An annotation refers to a persistent visible object created by user interaction, such as highlights, underlines, circles, margin bars, marginalia, circled passages and any other known or later-developed marks. The annotation can be created using a word processor tool or can be created by a freeform ink stroke.

In FIG. 1, an electronic document 300 includes a text section 310. Parts of the text section 310 are annotated with a circle 320, a margin note 330, a highlight 340 and underlines 350.

When the user marks digital ink as one or more annotations on an object, the systems and methods according to this invention determine whether strokes made to form a number of annotations should be considered as one annotation. In various exemplary embodiments, the systems and methods do this by determining, for example, whether one stroke is made within a predetermined time from a previous stroke or from the first stroke. For example, the highlight annotation 340 is considered as one annotation even though it would take two strokes to annotate each line, since the second strokes are made within a predetermined time of the first stroke. In addition, two strokes may be interpreted as one annotation if the second stroke is made within a predetermined proximity from the last stroke, or from any other earlier stroke. For example, the underlines 350 may be considered as one annotation since each underline but the first is within a predetermined proximity of a previous annotation.

Then, the annotations are grouped with, or "on" the underlying object. For example, if a word is underlined, then the word and the underline are grouped together. If a section of text range is highlighted, then the section and the highlight annotation are grouped together. In addition, annotations can be grouped with the underlying object by, for example, determining whether there is a connector, such as a line, connecting the annotation and the underlying object.

Furthermore, it should be appreciated that a plurality of annotations can be grouped with one underlying object. For example, the highlighted section may be further annotated by a margin note. In this case, both the highlight annotation and the margin note annotation are grouped with the underlying object for selection.

It should be appreciated that ranges of the objects to be grouped with the annotation can be selected or chosen by the user. For example, the user may desire to select a paragraph containing the annotation object as the underlying object for selection. In other instances, the user may desire to set only the annotation object as the underlying object for selection.

To select the object and the one or more associated annotations, the user can select either the object or the annotation using a selection device, such as a mouse. For example, if the user clicks the circle 320, the underlying object is selected. It should be appreciated that, in various exemplary embodiments, only one of the underlying object or the annotation may be selected. In addition, it should be appreciated that in various exemplary embodiments, one or more of the annotations grouped with the underlying object may be selected. For example, the user may determine if the most recent annotation is to be selected.

In various exemplary embodiments, the different types of the annotation could select different amount and/or aspect of objects. For instance, underlines, highlight, quotes and the like may be treated as a selection of the object, while handwritten notes may not be treated as the selection. Moreover, selecting annotations, such as margin bars and loosely circled passages, that are less specifically directed to a particular portion of the underlying object may not result in the underlying object being selected.

In various exemplary embodiments, the selected underlying object may be modified based on the annotations. For example, if the annotations are discontiguous, the underlying object may be modified such that a non-annotated section may be replaced with an ellipsis.

FIG. 2 shows a second exemplary embodiment of a document having discontiguous annotations. In FIG. 2, a section 400 of text region is marked with a plurality of underline annotations 410 that are discontiguous. As shown in FIG. 3, when the user selects the underlying object, the underlying object may be modified such that non-annotated sections in the underlying object may be replaced with characters 500, such as an ellipsis, i.e., " . . . ",. This allows the user to automatically summarize the selected object based on the annotations.

It should be appreciated that the selected object may be quoted at the time of when introduced to another document or the like, by adding quotation marks. In addition, if the selected object already has quotation marks, the original double quotation marks may be replaced with single quotation marks. Other modification may include changing the color, size, font and/or the like of the selected annotations and/or the underlying objects, capitalizing the first letter of the selected object, and/or putting brackets around the first letter if the selected object does not start at the beginning of a sentence, among others. Moreover, if bibliographic information of the object is available, the information may be associated with the selected object.

It should also be appreciated that, if the underlying object contains a reference, a citation, a hyperlink and/or a uniform resource locator (URL), the user can invoke a "fetch" command to retrieve the referenced document. When the underlying object is selected, a notification may be made so that the user can view the fetched document. , At this time, even if descriptions of document source may not be correctly displayed due to the limited boundary of a media (e.g., the description is broken by a word wrap or the like), correct document can be extracted since such document source can be correctly predicted.

Figure 5:
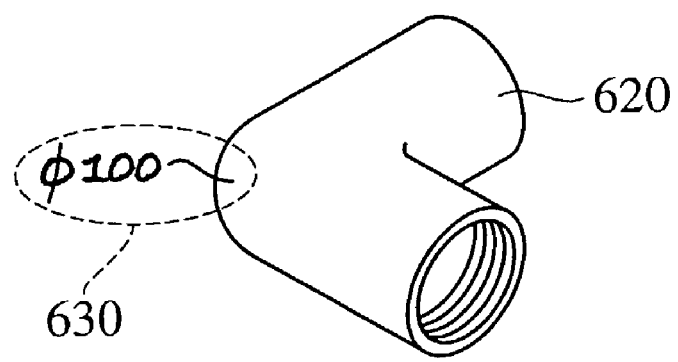

FIGS. 4 and 5 illustrate another example of selecting objects according to this invention. FIG. 4 shows a CAD drawing 600 of pipes 610 and 612 and a pipe fitting 620. An annotation 630 has been made to the pipe fitting 620. If, for example, the user clicks on the pipe fitting 620, or, alternatively, the annotation 630, the pipe fitting 620 is selected and viewed with the annotation 630.

It should be appreciated that, if available, a "cut-out" view of the pipe fitting 620 may be provided upon selecting of the underlying object and/or selecting the annotation. In various exemplary embodiments, other types of views, such as expansion views, views from various directions, cross-sectional views and the like, may also be provided.

It should also be appreciated that, if the underlying object has a related section, the related section may also be included in the user's selection when the underlying object is selected. For example, in the example shown in FIG. 4, if the pipe 610 and the pipe fitting 620 are parts of a pipe structure in a house, and the user selects the pipe fitting 620, the entire pipe structure may be selected.

Figure 6:
FIGS. 6 and 7 illustrate a third exemplary embodiment of selecting an object according to this invention.
Figure 7:
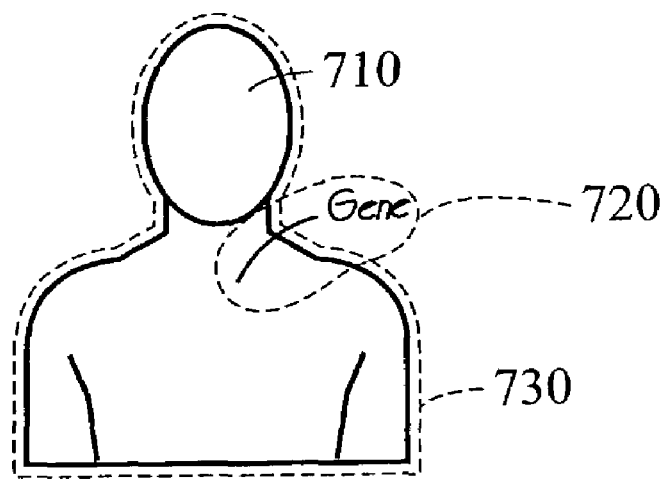

FIGS. 6 and 7 illustrate the third example of selecting an object and an annotation using the method according to this invention.

FIG. 6 shows an object 710, such as a person, that is a portion of, for example, an image 700. When the user invokes a command for selecting the person in the picture 710 or an annotation 720 associated with the object 710, either one or both of the person 710 and the annotation 720 can be selected. The process for selecting a part of an image may be performed using any known or latter-developed technique for selecting a part of an image. An example of a known selecting technique is described in "Mean Shift: A Robust Approach Towards Feature Space Analysis "by Comanicia et al., IEEE Transaction of Pattern Analysis and Machine Intelligence, Vol. 24, No. 5, May 2002. After the selection is completed, an indication 730 may appear, as shown in FIG. 7. The indication may include a solid line, a bold line, a dotted line, and highlighting the outline of the object.

If the user desires, the selected object and/or annotation may be copied. In this case, the selected objects and/or annotations may be directly or indirectly copied or cut and pasted. In other words, the selected objects and/or annotations may be copied (or cut) and pasted directly to the destination or may be copied (or cut) and to pasted in a temporary location, such as a clipboard, and then pasted on the destination media or medium.

Figure 8:
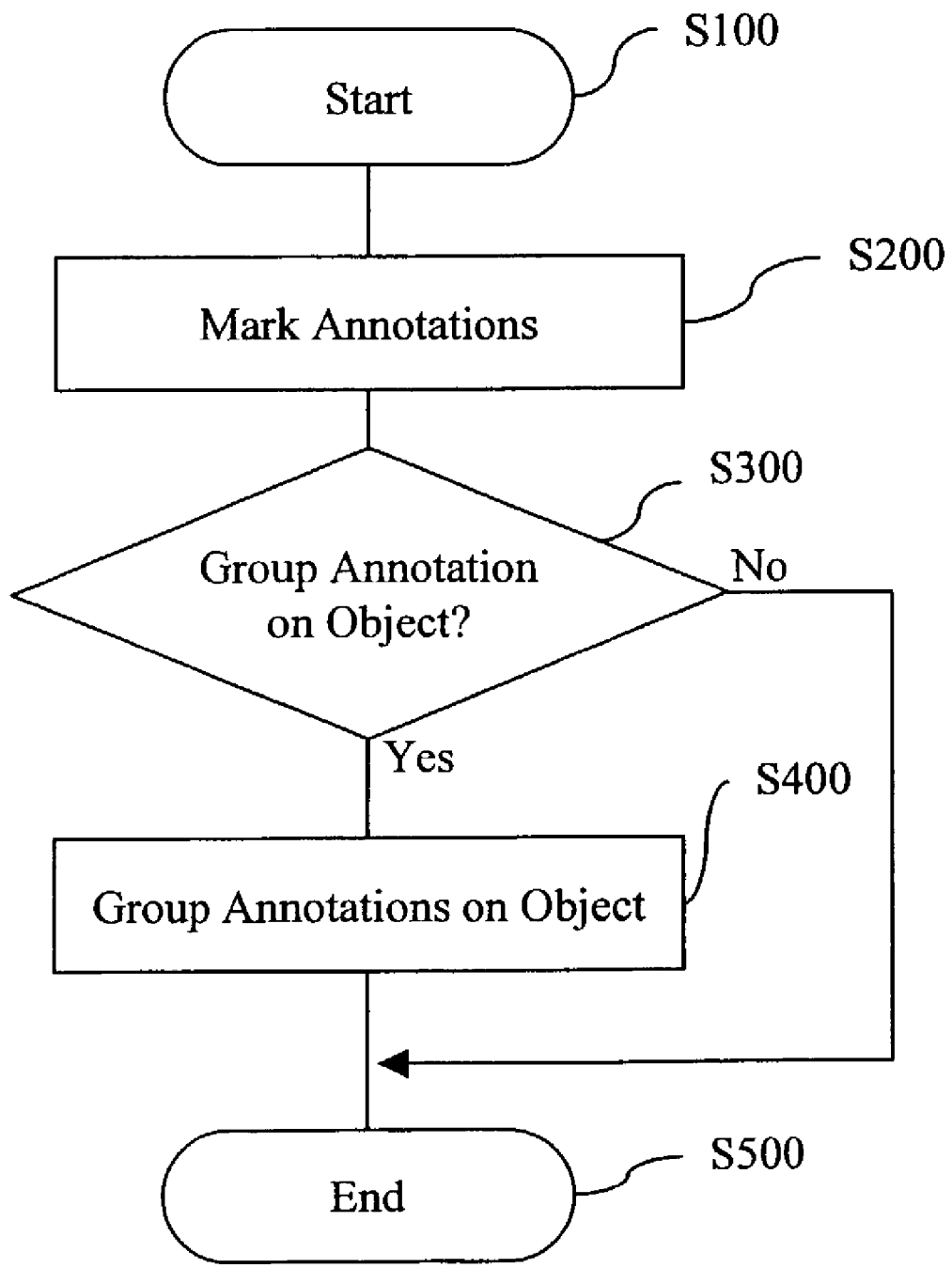
FIG. 8 is a flowchart outlining one exemplary embodiment of a method for grouping annotations on an object according to this invention.

FIG. 8 is a flowchart outlining one exemplary embodiment of a method for grouping annotations with the object according to this invention.

As shown in FIG. 8 operation of the method begins in step S100 and continues to step S200, where annotations, such as highlight, are marked on an object. Then in step S300, a determination is made whether the annotations satisfy the conditions for grouping. For example, a determination is made as to whether there are objects lying under the annotations. If the annotations are to be grouped on the object, operation continues to step S400. Otherwise, operation jumps directly to step S500, where operating the method ends. In step S400, the annotations are grouped on the object. Operation then continues to step S500.

Figure 9:
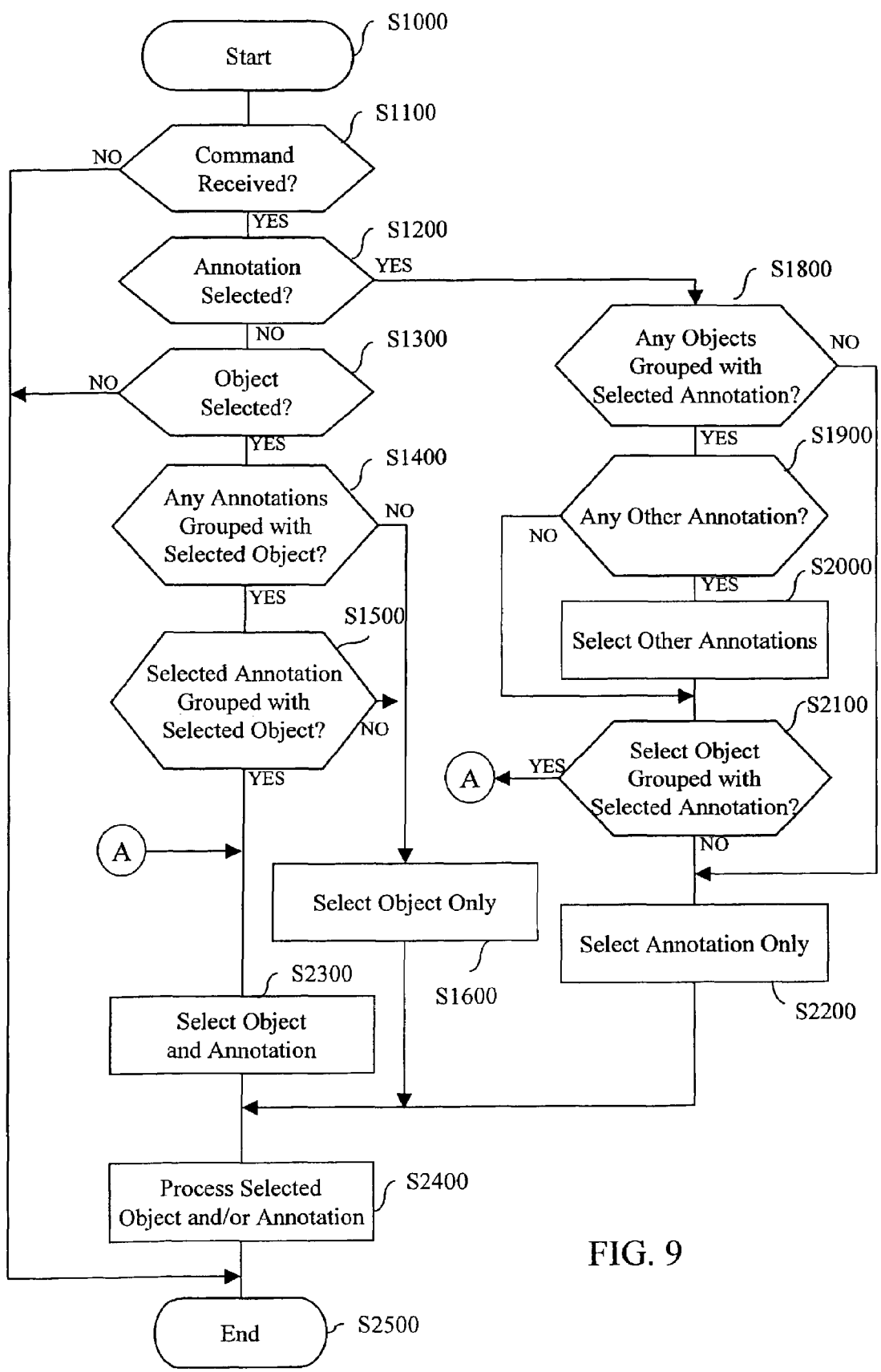
FIG. 9 is a flowchart outlining one exemplary embodiment of a method for selecting annotations grouped on the object according to this invention.

FIG. 9 is a flowchart outlining one exemplary embodiment of a method for selecting objects based on grouped annotations, according to this invention. Operation of the method begins at step S1000 and continues to step S1100, where a determination is made whether a command is received from the user. The command may be a tapping or clicking either on an object or on an annotation associated with the object. If a command is received, the process continues to step S1200. Otherwise, operation jumps to step S2500. In step S1200, a determination is made whether one or more annotations have been selected. If not, operation continues to step S1300. Otherwise, operation jumps to step S1800.

In step S1300, a determination is made whether an object with which the annotations are grouped is selected. If so, operation continues to step S1400. Otherwise, operation again jumps to step S2500. In step S1400, a determination is made whether there are any annotations grouped with the selected object. If so, operation continues to step S1500. Otherwise, operation jumps to step S1600. In step S1500, a determination is made whether the one or more annotations grouped with the object are selected. If so, operation jumps to step S2300. Otherwise, operation continues to step S1600. In step S2300, both the object and the one or more annotations grouped with the selected object are selected. Operation then continues to step S2400. In contrast, in step S1600, only the object is selected. Operation then jumps to step S2400.

In step S1800, a determination is made whether an object is grouped with the selected annotation. If so, operation continues to step S1900. Otherwise, operation jumps to step S2200. In step S1900, a determination is made whether any other annotations other than the selected annotations are grouped with the object. If so, operation continues to step S2000. Otherwise, operation jumps directly to step S2100. In step S2000, any such other annotations are also selected. Operation then continues to step S2100.

In step S2100, a determination is made whether the object grouped with the selected annotation is selected. If so, operation jumps to step S2300. Otherwise, operation continues to step S2200. In step S2200, only the annotations are selected. Next, in step 2400 the selected objects and/or annotations are processed. Operation then continues to step S2500. Next, in step S2500 where operation of the method ends.

It should be appreciated that, in various exemplary embodiments, the determination, regarding whether an object with which the annotations are grouped is selected, can be omitted. In this case, operation continues directly from step S1200 to step S1400 if one or more annotations are not selected. Similarly, in various exemplary embodiments, processing the selected object and/or one or more annotations in step S2400 can be omitted. In this case, operation jumps directly from steps S2200 and S2300 to step S2500.

Figure 10:
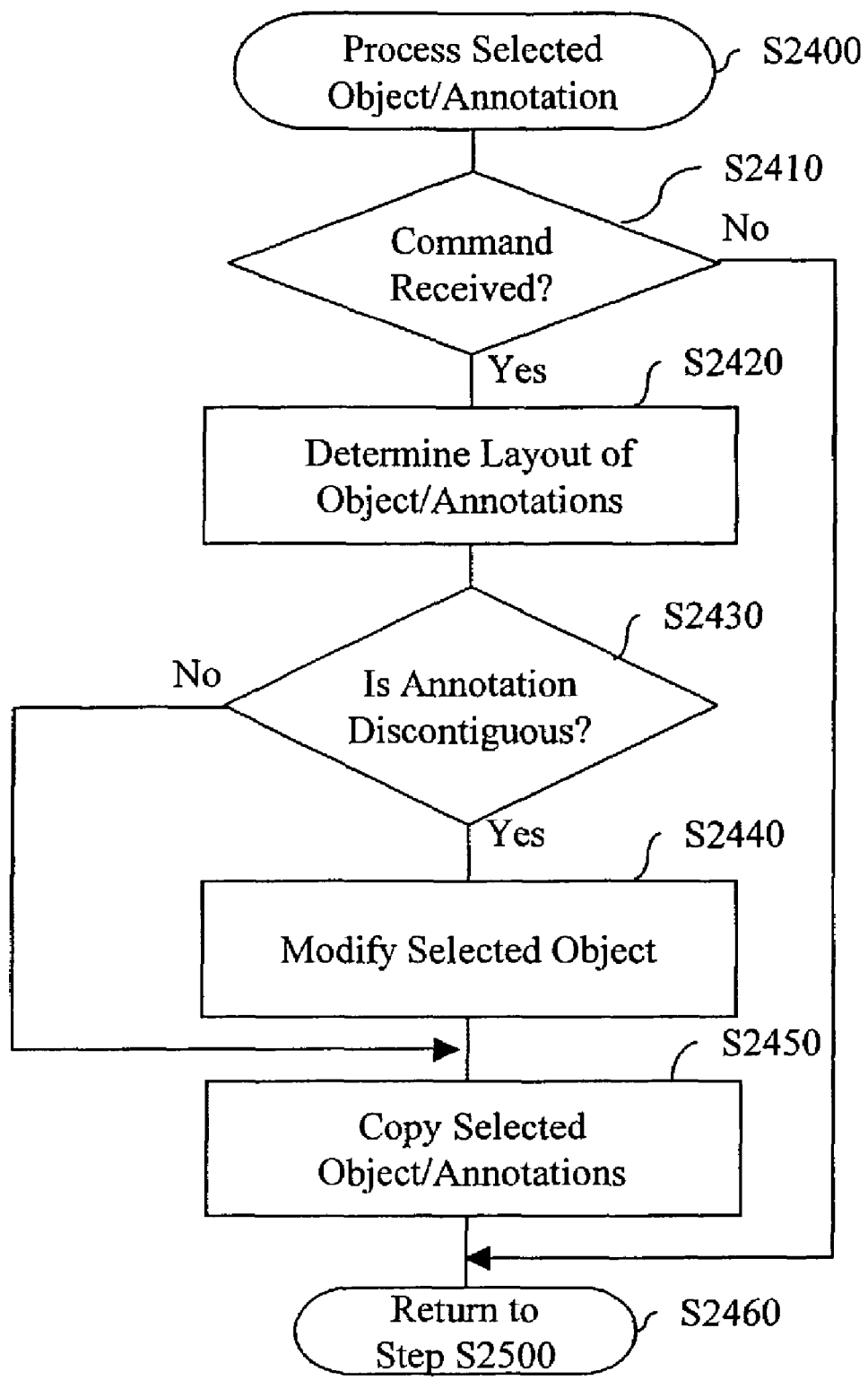
FIG. 10 is a flowchart outlining in greater detail one exemplary embodiment of the method for processing the selected annotations and object of FIG. 9 according to this invention.

FIG. 10 is a flowchart outlining one exemplary embodiment of a method for processing the selected object and/or one or more annotations of step 2400 of FIG. 9. Operation begins in step S2400 and continues to step S2410, where a determination is made whether a command for processing the selected object and/or annotations is received from the user. If so, operation continues to step S2420. Otherwise, operation jumps to step S2460.

In step S2420, a layout of the selected object and/or annotations is determined. Then, in step S2430, a determination is made whether the selected annotations are discontiguous. If so, operation continues to step S2440. Otherwise, operation jumps directly to step S2450. In step S2440, the selected object is modified. For instance, the selected object may be modified such that non-underlined sections are replaced with " . . . ", as shown in FIG. 3. Then, in step S2450, the selected object and/or annotations are directly or indirectly copied. Next, in step S2460, operation returns to step S2500.

Figure 11:
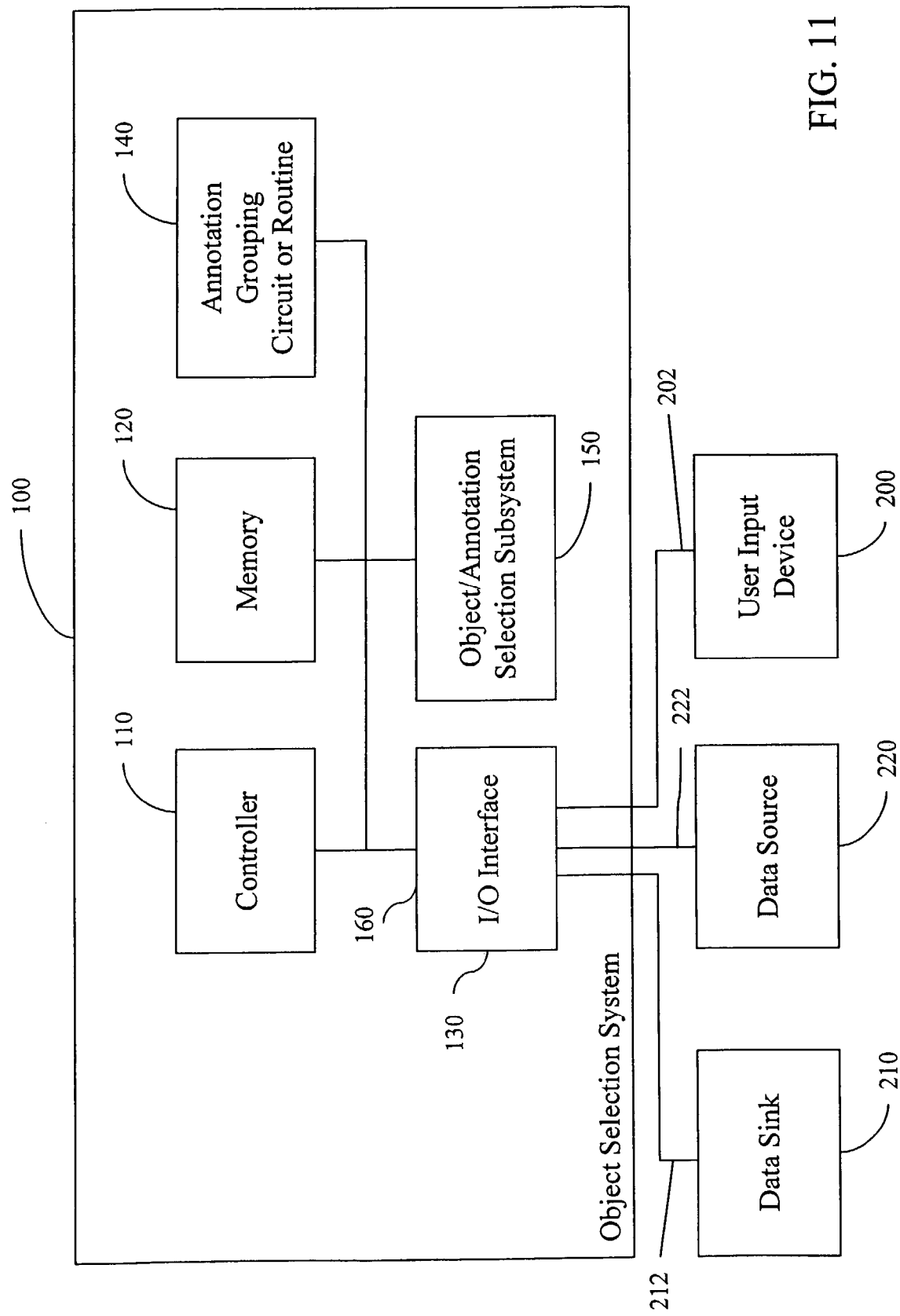
FIG. 11 is a block diagram showing an exemplary embodiment of an object/annotation selection system according to this invention.

FIG. 11 is a block diagram of one exemplary embodiment of an object/annotation selection system 100 according to this invention. As shown in FIG. 11, in various exemplary embodiments, the object/annotation selection system 100 includes a controller 110, a memory 120, an input/output interface 130, an annotation grouping circuit or routine 140 and an object selection subsystem 150, which are connected to each other via a data and/or control bus 160. One or more user input devices 200, a data sink 210 and a data source 220 are connected to the input/output interface 130 via communication links 202, 212 and 222, respectively.

The controller 110 controls the general data flow between other components of the object/annotation selection system 100. The memory 120 may serve as a buffer for information coming into or going out of the object/annotation selection system 100, may store any necessary programs and/or data for implementing the functions of the object/annotation selection system 100, and/or may store data and/or digital ink at various stages of processing.

Alterable portions of the memory 120 may be, in various exemplary embodiments, implemented using static or dynamic RAM. However, the memory 120 can also be implemented using a floppy disk and disk drive, a writable or rewritable optical disk and disk drive, a hard drive, flash memory or the like. The memory 120 may also be implemented using ROM. However, the static portions can also be implemented using other non-volatile memory, such as PROM, EPROM, EEPROM, an optical ROM disk, such as a CD-ROM or DVD-ROM, and disk drive, flash memory or other alterable memory, as indicated above, or the like.

The input/output interface 130 provides a connection between the object/annotation selection system 100 and the user input devices 200, the data sink 210 and the data source 220 via the communication links 202, 212 and 222, respectively. The annotation grouping circuit or routine 140 groups annotations made by the user on objects lying under the annotations.

The object/annotation selection subsystem 150 performs any necessary calculations and/or functions and executes any necessary programs for selecting and processing objects.

The user input devices 200 may be any known or later-developed device that is capable of imputing data and/or control commands to the object/annotation selection system 100 via the communication link 202. The user input device may be one or more of a keyboard, a mouse, a touch pen, a touch pad, a pointing device, or the like. Using the user input devices 200, the user can, for example, draw digital ink on the electronic media, such as a document, as annotations and select the underlying object by, for example, tapping the object and/or annotations.

In various exemplary embodiments, the data sink 210 can be any known or later-developed device that is capable of outputting or storing the processed media data generated using the systems and methods according to this invention, such as a display device, a printer, a copier or other image forming device, a facsimile device, a memory and the like. In the exemplary embodiments, the data sink 210 is a display device, such as a computer monitor or the like, and connected to the object/annotation selection system 100 over the communications link 212.

The data source 220 can be a locally or remotely located computer sharing data, a scanner, or any other known or later-developed device that is capable of generating electronic media, such as a document. The data source 220 may also be a data carrier, such as a magnetic storage disc, CD-ROM or the like. Similarly, the data source 220 can be any suitable device that stores and/or transmits electronic media data, such as a client or a server of a network, or the Internet, and especially the World Wide Web, and news groups. The data source 220 may also be a live video conferencing device, a television, a video tape player or any know or latter developed device that broadcasts media data.

It should also be appreciated that the electronic media data of the data source 220 may be a scanned image of a physical document or a photograph, video recordings, media data created electronically using any software, such as word processing software, or media data created using any known or later developed programming language and/or computer software program, the contents of an application window on a user's desktop, e.g., the toolbars, windows decorations, and spreadsheet shown in a spreadsheet program, a live broadcasting of a video image, or any other known or later developed data sources.

The communication links 202, 212 and 222 can each be any known or later-developed device or system for connecting the user input device 200, the data sink 210 and the data source 220, respectively, to the object/annotation selection system 100, including a direct cable connection, a connection over a wide area network or local area network, a connection over an intranet, a connection over the Internet, or a connection over any other distributed processing network system. Further, it should be appreciated that the communication links 202, 212 and 222 can be a wired or wireless connection to a network. The network can be a local area network, a wide area network, an intranet, the Internet, or any other known or later-developed other distributed processing and storage network.

Figure 12:
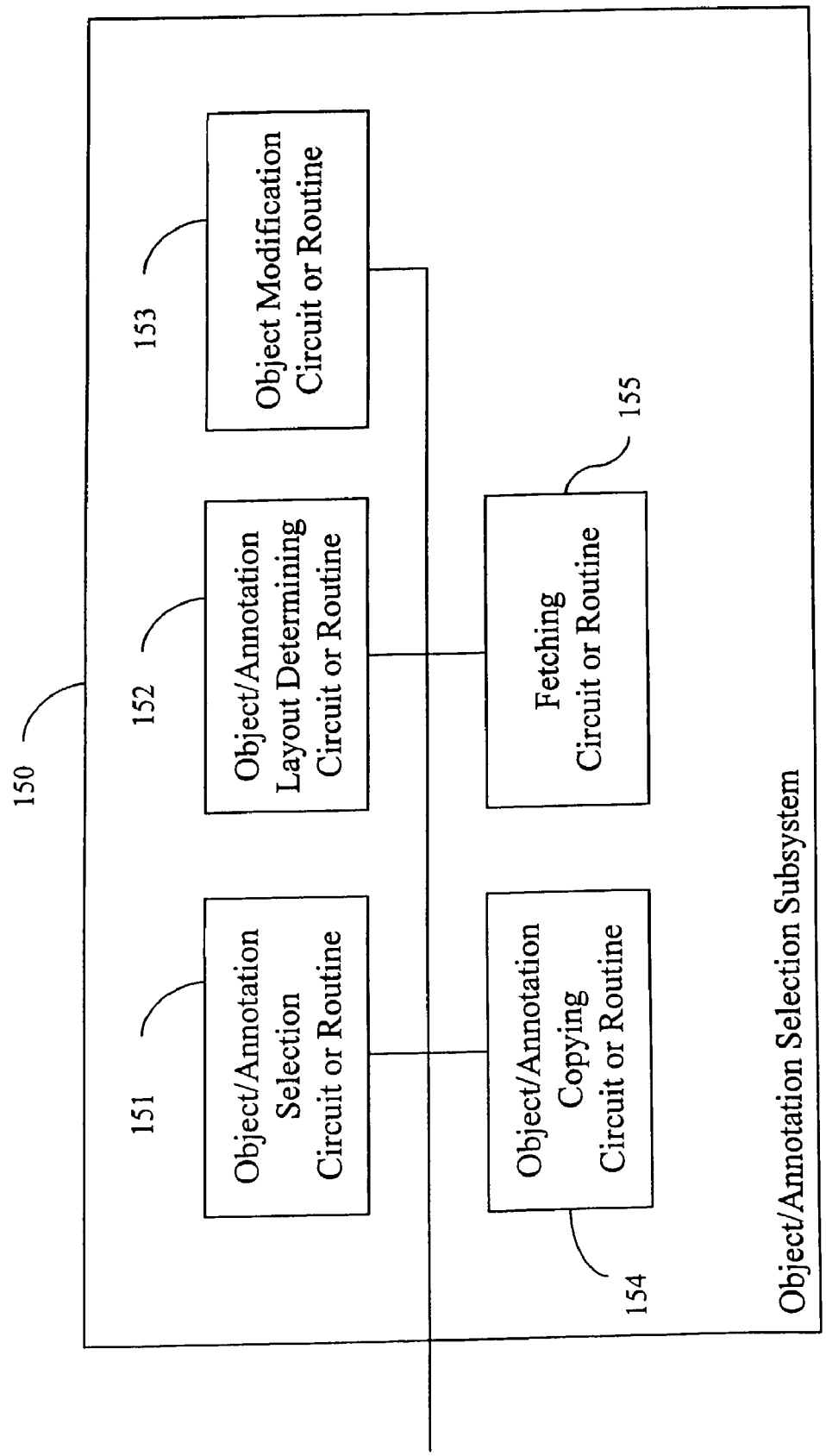
FIG. 12 is a block diagram showing in greater detail an exemplary embodiment of an object/annotation selection circuit or routine shown in FIG. 11.

FIG. 12 is a block diagram outlining in greater detail one exemplary embodiment of the object/annotation selection subsystem 150. As shown in FIG. 12, the object/annotation selection subsystem 150 includes one or more of an object/annotation selection circuit or routine 151, an object/annotation layout determination circuit or routine 152, an object modification circuit or routine 153, an object/annotation copying circuit or routine 154, and/or fetching circuit or routine 155.

The object/annotation selection circuit or routine 151 selects objects and/or annotations based on one or more received user commands by determining the grouping of the object and annotations accomplished by the annotation grouping circuit 140. The user may desire to select one or more of only the objects, only the annotations, or both of the objects and annotations regardless of the grouping. Furthermore, the selection of annotations may depend on the types of the annotations. For instance, the user may desire that any handwritten memo is not to be selected. The user may also desire to select or not to select a part or all of previously marked annotation if necessary. In this case, the user may select the part or all of previous marked annotation by, for example, tapping on the annotation.

The object/annotation layout determination circuit or routine 152 determines the layout of the objects. For example, if the object is text, the object/annotation layout determination circuit or routine 152 may determine the font type, color, size and/or style, such as italics, bold, and underline, of the text, and the like. If the object is graphic, the object/annotation layout determination circuit or routine 152 may store the position of the object with respect to the area of the media. For example, if the object is a CAD image, the object/annotation layout determination circuit or routine 152 may determine the information of the position of the annotated object and the annotation, and such information of the position may be preserved.

The object modification circuit or routine 153 modifies the selected object. For example, if the selected object is text, the object modification circuit or routine 153 may change the font type, color, size and/or style, such as italics, bold, and underline, of the text, and the like. The object/annotation modification circuit or routine 153 may also, for example, add bibliographic information, if available, to the selected object, replace double quotes with single quotes, capitalize the first letter, and/or put the first letter of the selected object in brackets if the selected object does not start at the beginning of a sentence, and the like. The object modification circuit or routine 153 may also capture only annotated part of the selected object and replace the non-annotated part with an ellipsis.

In addition, if the selected object is graphic, the object/annotation modification circuit or routine 153 may modify the size of the selected object and/or cut a selected section of the object. For example, if the user annotates one or more parts in a CAD diagram, the object/annotation modification circuit or routine 153 may select only the annotated parts but may also select other objects that are connected or otherwise related to those objects. Moreover, the object/annotation modification circuit or routine 153 may modify the object such that, for example, a "cut-away" view may be shown, for example. Other examples include changing orientation, known or later-developed visual effects and visual transformation.

Furthermore, the object/annotation modification circuit or routine 153 may recognize handwriting in the annotation and convert it to text. Then the object/annotation modification circuit or routine 153 may associate the converted annotation with the object.

The object/annotation copying circuit or routine 154 copies selected objects to, for example, another media. The object/annotation copying circuit or routine 154 can directly copy the selected objects to another media or can copy the selected objects and/or annotations to, for example, a temporary memory location, such as a clip board. The selected objects and/or annotations can later be copied to another media.

The fetching circuit or routine 155 determines whether the annotated objects and/or annotations include a reference. If so, the fetching circuit or routine retrieves the reference. For example, the fetching circuit or routine 155 may retrieve a cited section of a document if the selected objects include or the annotations are made to, for example, the title and page numbers of a book. The fetching circuit or routine 155 may also allow the user to retrieve a web site on or document from the Internet, an intranet, any open or closed network, and/or the like if the selected object or the annotation includes, for example, a hyperlink or a uniform resource locator (URL).

This invention is not limited to the above described methods and system. One of ordinary skill in the art would understand that many different modifications are possible without departing from the scope of the invention.

Additionally, those skilled in the art will recognize many applications for the present invention, including but not limited to display device, such as file browser devices, systems that display applications of a personal computer, handheld devices, and the like. In short, the invention has application to any known or later developed system and device capable of selecting objects by grouping annotations on the objects.

It is apparent that these steps shown in FIGS. 8-10 are described in above order for illustration purpose, and in various exemplary embodiments, the selection of the objects may be performed in different order and/or with any additional or fewer steps.

For example, it is possible, in order to select the annotations grouped on the object, to provide additional steps to determine whether there are any other annotations other than the selected annotation that are grouped on the object.

Furthermore, in the various exemplary embodiments outlines above, it is apparent that the selection of the object may be performed automatically or manually by the user.

In the various exemplary embodiments outlines above, the object/annotation selection system 100 can be implemented using a programmed general purpose computer. However, the object/annotation selection system 100 can also be implemented using a special purpose computer, a programmed microprocessor or microcontroller and peripheral integrated circuit elements, and ASIC or other integrated circuit, a digital signal processor, a hardware electronic or logic circuit, such as a discrete element circuit, a programmable logic device, such as PLD, PLA, FPGA or PAL, or the like. In general, any device, capable of implementing a finite state machine that is in turn capable of implementing the flowcharts shown in FIGS. 8-10, can be used to implement the object/annotation selection system 100.

Each of the circuits or routine and elements of the various exemplary embodiments of the object/annotation selection system 100 outlines above can be implemented as portions of a suitable programmed general purpose computer. Alternatively, each of the circuits and elements of the various exemplary embodiments of the object/annotation selection system 100 outlined above can be implemented as physically distinct hardware circuits within an ASIC, or using FPGA, a PDL, a PLA or a PAL, or using discrete logic elements or discrete circuit elements. The particular form each of the circuits and elements of the various exemplary embodiments of the object/annotation selection system 100 outlined above will take is a design choice and will be obvious and predicable to those skilled in the art.

Moreover, the various exemplary embodiments of the object/annotation selection system 100 outlined above and/or each of the various circuits and elements discussed above can each be implemented as software routines, managers or objects executing on a programmed general purpose computer, a special purpose computer, a microprocessor or the like. In this case, the various exemplary embodiments of the object/annotation selection system 100 and/or each or the various circuits and elements discussed above can each be implemented as one or more routines embedded in the communication network, as a resource residing on a server, or the like. The various exemplary embodiments of the object/annotation selection system 100 and the various circuits and elements discussed above can also be implemented by physically incorporating the object/annotation selection system 100 in to a software and/or hardware system, such as the hardware and software system of a web server or a client device.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method for copying annotated documents from one location to another location in an electronic medium or between electronic media, the method comprising:
   displaying a document to a user, the document including objects, the objects including text objects and graphic objects;
   receiving, from the user, at least one annotation on the document, the annotation being a visible object created by user interaction;
   automatically grouping at least some of the at least one annotation with the an object of the document to obtain a grouped annotation, the object of the document being an underlying object of the annotation; and
   receiving from the user a selection of either the at least one annotation, or the underlying object of the annotation, or the grouped annotation;
   modifying the underlying object responsive to a type of the at least one annotation to obtain a modified selection; and
   copying the modified selection to at least one of a different part of the electronic media and another media,
   wherein the modifying includes replacing portions of the underlying object in the grouped annotation with ellipses.

2. The method of claim 1 wherein, the modifying the underlying object includes changing appearance of the modified selection.

3. The method of claim 2 wherein the appearance includes at least one of color, size, font, underlining, capitalization, and brackets.

4. The method of claim 1 wherein the modifying the underlying object includes providing a cut-out view of the underlying object.

5. The method of claim 1 wherein, if the at least one annotation is handwritten the receiving from the user a selection further comprises not selecting the at least one annotation.

6. The method of claim 1 further comprising:
   determining a layout of the modified selection; and
   copying the modified selection according to the layout.

7. The method of claim 1 further comprising:
   determining reference information in the underlying object;
   retrieving a reference cited in the reference information; and
   associating the reference information with the underlying object.

8. The method of claim 1, wherein an indication is added to the selection, the indication includes at least one of a solid line, a bold line, a dotted line, and highlighting an outline of the selected at least a part of the at least one object.

9. A system for copying annotated documents from one location to another location in an electronic medium or between electronic media, the system comprising:
   a display unit for displaying a document to a user, the document including objects, the objects including text objects and graphic objects;
   an input unit for receiving, from the user, at least one annotation on the document, the annotation being a visible object created by user interaction;
   a grouping unit for automatically grouping at least some of the at least one annotation with the an object of the document to obtain a grouped annotation, the object of the document being an underlying object of the annotation;
   wherein the input unit is further operable for receiving from the user a selection of either the at least one annotation, or the underlying object of the annotation, or the grouped annotation;
   a modifying unit for modifying the underlying object responsive to a type of the at least one annotation to obtain a modified selection; and
   a copying unit for copying the modified selection to at least one of a different part of the electronic media and another media,
   wherein the modifying unit is further operable for replacing portions of the underlying object in the grouped annotation with ellipses.

10. The system of claim 9 wherein, the modifying unit is further operable to modify the underlying object by changing appearance of the modified selection.

11. The system of claim 9 wherein the modifying unit is further operable to modify the underlying object by providing a cut-out view of the underlying object.

12. The system of claim 9 wherein, if the at least one annotation is handwritten the receiving unit is further operable to not select the at least one annotation.

13. The system of claim 9 further comprising:
   a determining unit for determining a layout of the modified selection; and
   wherein the copying unit is further operable for copying the modified selection according to the layout.

14. The system of claim 9 further comprising:
   a determining unit for determining reference information in the underlying object;
   a retrieving unit for retrieving a reference cited in the reference information; and
   an associating unit for associating the reference information with the underlying object.

15. A computer readable storage medium, comprising:
   computer readable program code embodied on the computer readable storage medium, the computer readable program code usable to program a computer to program a method for copying annotated documents from one location to another location in an electronic medium or between electronic media, comprising:
   displaying a document to a user, the document including objects, the objects including text objects and graphic objects;
   receiving, from the user, at least one annotation on the document, the annotation being a visible object created by user interaction;
   automatically grouping at least some of the at least one annotation with the an object of the document to obtain a grouped annotation, the object of the document being an underlying object of the annotation; and
   receiving from the user a selection of either the at least one annotation, or the underlying object of the annotation, or the grouped annotation;
   modifying the underlying object responsive to a type of the at least one annotation to obtain a modified selection; and copying the modified selection to at least one of a different part of the electronic media and another media, wherein the modifying includes replacing portions of the underlying object in the grouped annotation with ellipses.

16. The computer readable storage medium of claim 15 further comprising modifying the underlying object by changing appearance of the modified selection.

17. The computer readable storage medium of claim 15 further comprising modifying the underlying object by providing a cut-out view of the underlying object.

18. The computer readable storage medium of claim 15 wherein, if the at least one annotation is handwritten, further comprising not select the at least one annotation.

19. The computer readable storage medium of claim 15 further comprising:
   determining a layout of the modified selection; and
   copying the modified selection according to the layout.

20. The computer readable storage medium of claim 15 further comprising:
   determining reference information in the underlying object;
   retrieving a reference cited in the reference information; and
   associating the reference information with the underlying object.

* * * * *